(12) United States Patent
Chang

(10) Patent No.: US 7,547,986 B2
(45) Date of Patent: Jun. 16, 2009

(54) WIND POWER GENERATING DEVICE

(76) Inventor: Wen-Wei Chang, No. 15-13, Tienchonyang, Neighborhood 3, Beigang Village, Dayuan Township, Taoyuan County (TW) 337

( * ) Notice: Subject to any disclaimer, the term of this patent is extended or adjusted under 35 U.S.C. 154(b) by 154 days.

(21) Appl. No.: 11/856,269

(22) Filed: Sep. 17, 2007

(65) Prior Publication Data
US 2009/0074566 A1    Mar. 19, 2009

(51) Int. Cl.
*F03D 9/00* (2006.01)
(52) U.S. Cl. .................. 290/55; 44/50; 44/53; 44/54
(58) Field of Classification Search .............. 290/2, 290/44, 50, 54, 53, 55
See application file for complete search history.

(56) References Cited

U.S. PATENT DOCUMENTS 7,427,814 B2 *  9/2008  Bagepalli et al. .............. 290/55
7,476,987 B2 *  1/2009  Chang .......................... 290/55

* cited by examiner

*Primary Examiner*—Nicholas Ponomarenko
*Assistant Examiner*—Iraj A Mohandesi
(74) *Attorney, Agent, or Firm*—WPAT, P.C.; Anthony King

(57) ABSTRACT

A wind power generating device includes a housing, a transmission unit, at least one winding disc, at least one magnetic disc, and a rotating unit. When there are a plurality of winding discs and a plurality of magnetic discs, the winding discs and the magnetic discs are axially spaced and alternately arranged in the housing behind the transmission unit. When the magnetic discs are directly rotated by the rotating unit and the winding discs are indirectly rotated by the rotating unit via the transmission unit, magnetic bodies on the magnetic discs and windings on the winding discs are quickly moved in a relative motion to produce relatively large flux change, enabling the wind power generating device to have increased power generation capacity.

8 Claims, 4 Drawing Sheets

US 7,547,986 B2

WIND POWER GENERATING DEVICE

FIELD OF THE INVENTION

The present invention relates to a wind power generating device, and more particularly to a wind power generating device that internally includes a plurality of axially alternately arranged winding discs and magnetic discs, which are quickly rotated in a relative motion to produce large flux change.

BACKGROUND OF THE INVENTION

Generally, a wind power generating device includes a base, a power generator, and a fan wheel connected to the power generator. The fan wheel receives and is pushed by intake wind current, so as to retrieve and convert wind energy in the wind current into mechanical energy. The power generator connected to the fan wheel receives and is therefore driven by the mechanical energy transmitted by the fan wheel to generate electric energy.

In the above-described conventional wind power generating device, the fan wheel is the only means that directly brings the power generator to generate electric power. And, in the power generator, only the windings or the magnetic bodies thereof are rotated without any other transmission gear. Therefore, the fan wheel rotates faster when the intake wind current is strong, and rotates slower when the intake wind current is weak. That is, the rotational speed of the fan wheel is affected by the strength of the intake wind current. As a result, the power generator could only have relatively small power generation capacity, and the whole wind power generating device fails to supply a large scale of power.

SUMMARY OF THE INVENTION

A primary object of the present invention is to provide a wind power generating device that is able to produce relatively large flux change to thereby obtain relatively high power generation capacity.

Another object of the present invention is to provide a wind power generating device, of which the power generation capacity may be increased according to actual need.

To achieve the above and other objects, the wind power generating device according to the present invention includes a housing having a front end wall, a rear end wall, and a peripheral wall longitudinally extended between the front and the rear end wall; a transmission unit being mounted on the front end wall of the housing, and including a toothed ring, a sun gear located at a center of the toothed ring, and a plurality of planetary gears located between and meshing with the toothed ring and the sun gear; at least one winding disc being arranged inside the housing behind the transmission unit and provided on one surface facing toward the transmission unit with a plurality of forward extended shafts separately extended through the planetary gears, and the winding disc having a plurality of windings provided thereon; a plurality of carbon brushes being provided inside the housing to contact with the winding disc; at least one magnetic disc being arranged inside the housing adjacent to the winding disc, and having a plurality of magnetic bodies provided thereon for cooperating with the windings to produce a magnetic effect; and a rotating unit including a spindle and a driving blade, the spindle being extended through the housing, the sun gear, the magnetic disc, and the winding disc, and being connected to the sun gear and the magnetic disc, and the driving blade being mounted to a front end of the spindle closer to the transmission unit and located outside the housing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
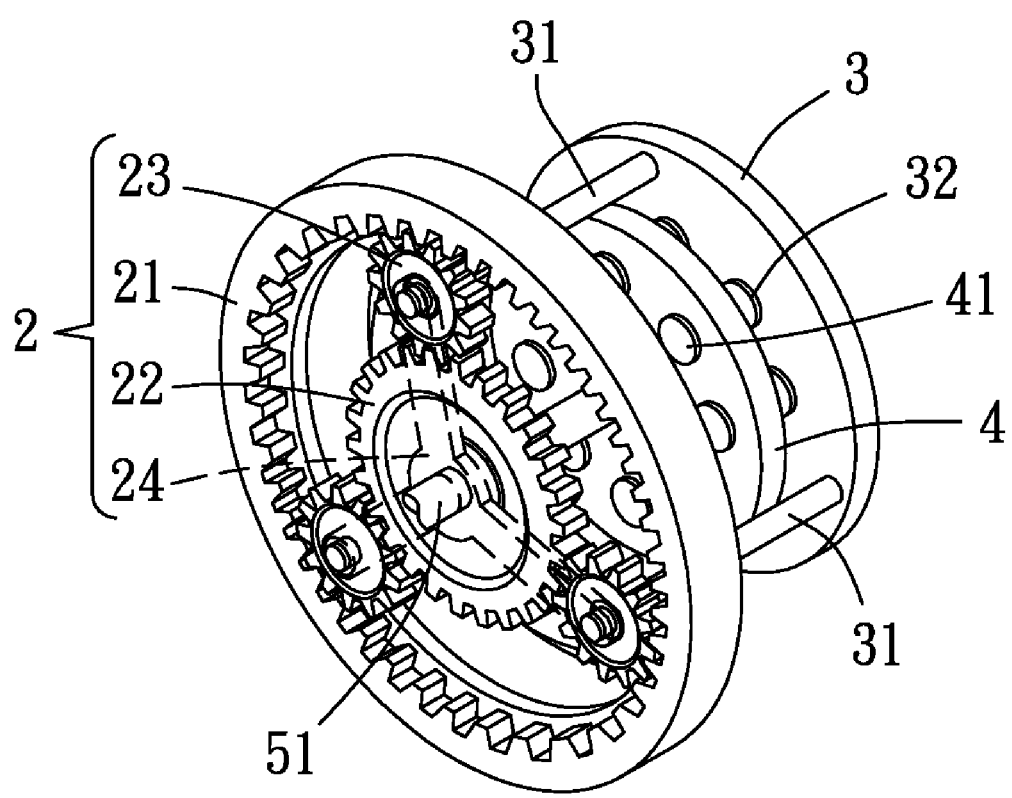
FIG. 1 is an assembled perspective view of a wind power generating device according to a first embodiment of the present invention with a housing and a driving blade removed therefrom.
Figure 2:
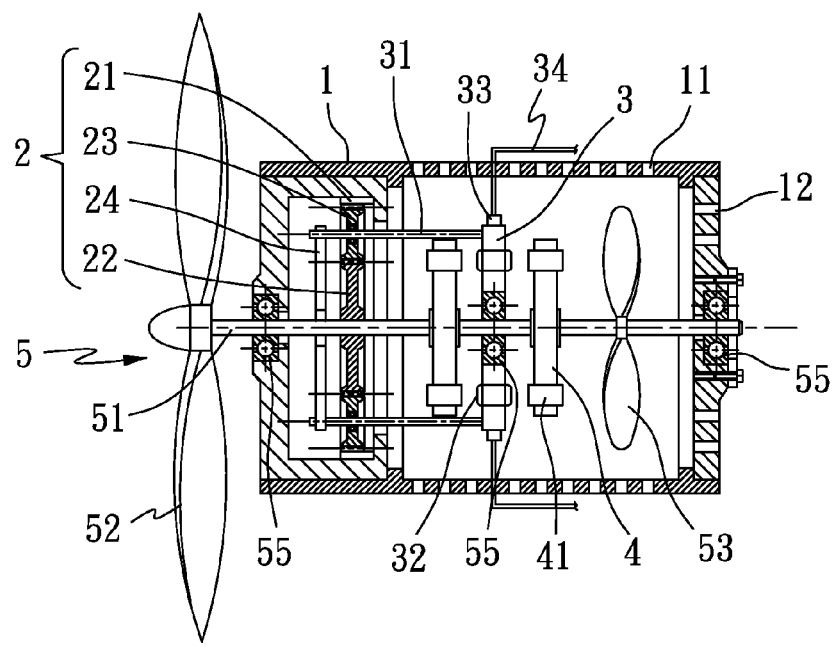
FIG. 2 is a longitudinal sectional view of the wind power generating device according to the first embodiment of the present invention.

Please refer to FIG. 1 that is an assembled perspective view showing part of a wind power generating device according to a first embodiment of the present invention, and to FIG. 2 that is a longitudinal sectional view of the wind power generating device according to the first embodiment of the present invention. As shown, the wind power generating device in the first embodiment includes a housing 1, a transmission unit 2, a winding disc 3, at least one magnetic disc 4, and a rotating unit 5.

The housing 1 is provided on a peripheral wall thereof with a plurality of air intakes 11, and on a rear end wall thereof with a plurality of air outlets 12.

The transmission unit 2 is mounted on a front end wall of the housing 1, and includes a toothed ring 21, a sun gear 22 located at a center of the toothed ring 21, a plurality of planetary gears 23 located between and meshing with the toothed ring 21 and the sun gear 22, and a support 24 located in front of the toothed ring 21.

The winding disc 3 is arranged inside the housing 1 behind the transmission unit 2, and is provided on one surface facing toward the transmission unit 2 with a plurality of forward extended shafts 31, free ends of which are separately extended through the planetary gears 23 to connect to the support 24. On the winding disc 3, there are provided a plurality of windings 32. A plurality of carbon brushes 33 are provided inside the housing 1 to contact with the winding disc 3. Each of the carbon brushes 33 has conductors 34 connected thereto.

The magnetic disc 4 is arranged inside the housing 1 adjacent to the winding disc 3, and has a plurality of magnetic bodies 41 provided thereon.

The rotating unit 5 includes a spindle 51, a driving blade 52, and a cooling blade 53. The spindle 51 is extended through the housing 1, the sun gear 22, the magnetic disc 4, and the winding disc 3, and is connected to the sun gear 22 and the magnetic disc 4. The driving blade 52 is mounted to a front end of the spindle 51 closer to the transmission unit 2 and located outside the housing 1, and the cooling blade 53 is mounted on the spindle 51 at a position behind the magnetic disc 4 or the winding disc 3 to locate inside the housing 1. The spindle 51 is provided at positions passing through the front end wall and the rear end wall of the housing and the center of the winding disc 3 with a bearing 55 each.

Figure 3:
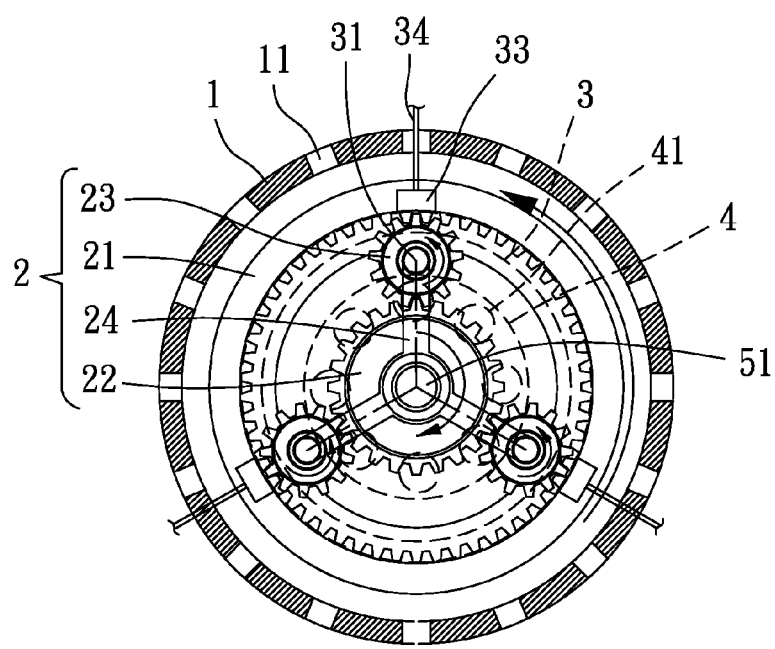
FIG. 3 is a cross sectional view of the wind power generating device of FIG. 2 showing the rotary operation thereof.

FIG. 3 is a cross sectional view of the wind power generating device according to the first embodiment of the present invention. Please refer to FIGS. 2 and 3 at the same time. When the driving blade 52 of the rotating unit 5 is rotated by a required wind force, the driving blade 52 brings the spindle 51 to rotate at the same time. The bearings 55 allow the spindle 51 to rotate smoothly without interfering with the movement of the winding disc 3. The sun gear 22 and the magnetic disc 4 connected to the spindle 51 are rotated along with the spindle 51. When the sun gear 22 is rotated, it cooperates with the toothed ring 21 to bring the planetary gears 23 to rotate in a direction opposite to the rotation direction of the sun gear 22 while moving along the toothed ring 21. Since the planetary gears 23 are separately associated with the shafts 31 forward extended from the winding disc 3, the winding disc 3 is brought by the moving planetary gears 23 to rotate about the spindle 51 relative to the magnetic disc 4 at high speed, so that a relatively large flux change is produced by the magnetic bodies 41 on the magnetic disc 4 and the windings 32 on the winding disc 3. As a result, a higher power generation capacity may be obtained. The generated electric power is transmitted via the carbon brushes 33 and the conductors 34 to an accumulator unit or to a desired apparatus for use. When the rotating unit 5 is rotated, the cooling blade 53 located inside the housing 1 also rotates along with the spindle 51 to suck external cold air into the housing 1 via the air intakes 11. Through heat exchange in the housing 1, the cold air is heated and then discharged by the cooling blade 53 out of the housing 1 via the air outlets 12. In this manner, the winding disc 3 and the magnetic disc 4 could operate in the housing 1 in a highly stable state.

Figure 4:
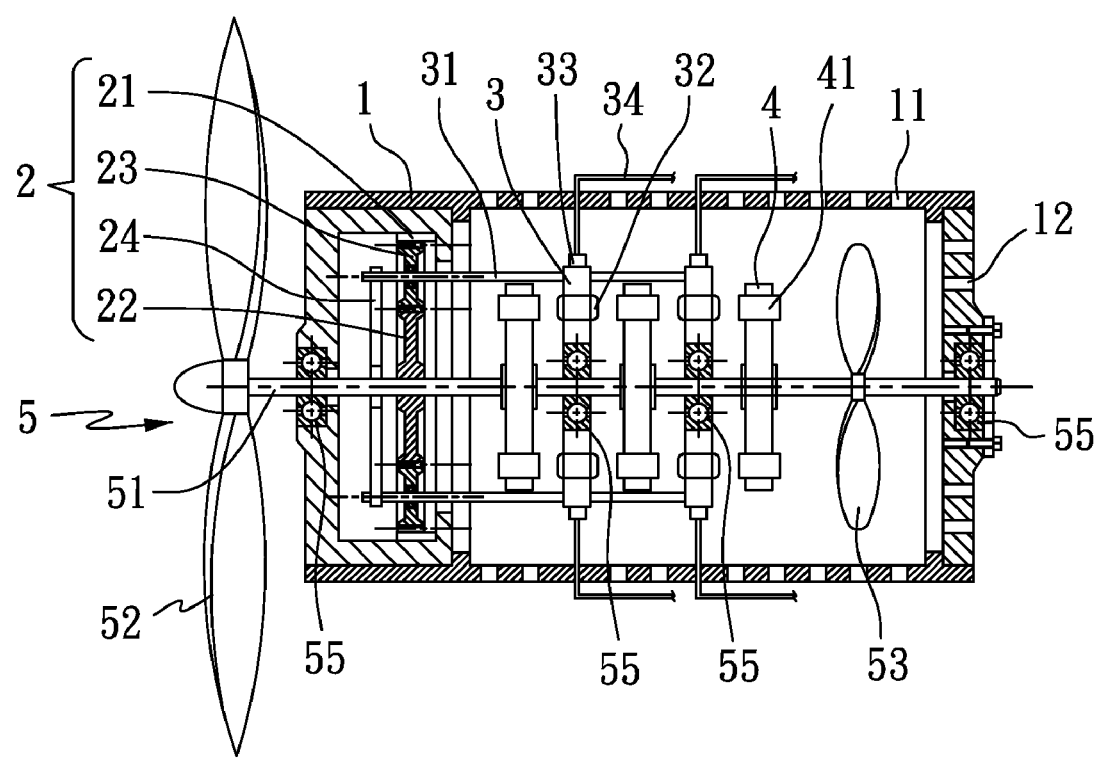
FIG. 4 is a longitudinal sectional view of a wind power generating device according to a second embodiment of the present invention.

FIG. 4 is a longitudinal sectional view of a wind power generating device according to a second embodiment of the present invention. As shown, the power generating device in the second embodiment is generally structurally similar to the first embodiment, except that it has two or more winding discs 3 and three or more magnetic discs 4 arranged in the housing 1. The winding discs 3 and the magnetic discs 4 are axially spaced and alternately arranged in the housing 1, so that the winding discs 3 and the magnetic discs 4 are rotated at a high speed in a relative motion, and a relatively large flux change is produced by the magnetic bodies 41 on the magnetic discs 4 and the windings 32 on the winding discs 3. As a result, an even higher power generation capacity may be obtained.

Figure 5:
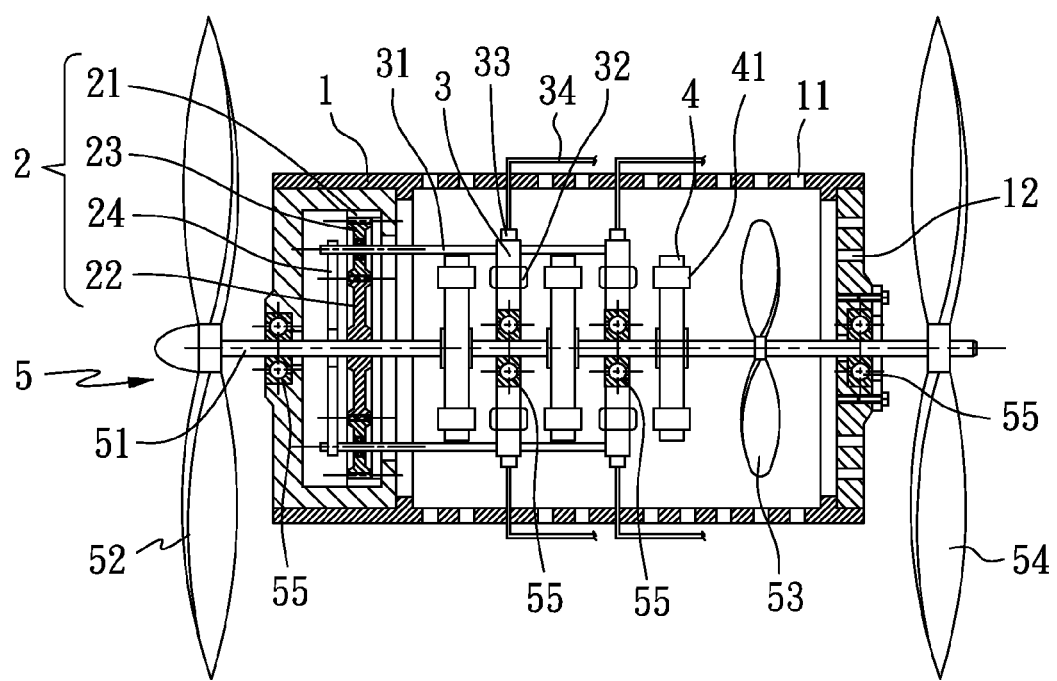
FIG. 5 is a longitudinal sectional view of a wind power generating device according to a third embodiment of the present invention.

FIG. 5 is a longitudinal sectional view of a wind power generating device according to a third embodiment of the present invention. As shown, the power generating device in the third embodiment is generally structurally similar to the first and the second embodiment, except that it further includes a secondary driving blade 54 mounted to the spindle 51 of the rotating unit 5 to locate outside the rear end wall of the housing 1. When the driving blade 52 and the secondary driving blade 54 are simultaneously rotated by a required wind force, the transmission unit 2 and the rotating unit 5 could operate more stably for the winding discs 3 and the magnetic discs 4 to rotate at a high speed in a relative motion and thereby generate power.

In the wind power generating device of the present invention, since the transmission unit 2 and the rotating unit 5 cooperate with each other for the winding discs 3 and the magnetic discs 4 to rotate at high speed in a relative motion and thereby produce a relatively large flux change, an increased power generation capacity may be obtained. Moreover, since the numbers of the axially spaced and alternately arranged winding discs 3 and magnetic discs 4 may be increased as necessary, the wind power generating device of the present invention is very flexible in design to provide different levels of power generation capacity to meet a user's actual need.

What is claimed is:

1. A wind power generating device, comprising:
   a housing having a front end wall, a rear end wall, and a peripheral wall longitudinally extended between the front and the rear end wall;
   a transmission unit being mounted on the front end wall of the housing, and including a toothed ring, a sun gear located at a center of the toothed ring, and a plurality of planetary gears located between and meshing with the toothed ring and the sun gear;
   at least one winding disc being arranged inside the housing behind the transmission unit and provided on one surface facing toward the transmission unit with a plurality of forward extended shafts separately extended through the planetary gears; and the winding disc having a plurality of windings provided thereon;
   a plurality of carbon brushes being provided inside the housing to contact with the winding disc;
   at least one magnetic disc being arranged inside the housing adjacent to the winding disc, and having a plurality of magnetic bodies provided thereon for cooperating with the windings on the winding disc to produce a magnetic effect; and
   a rotating unit including a spindle and a driving blade; the spindle being extended through the housing, the sun gear, the magnetic disc, and the winding disc, and being connected to the sun gear and the magnetic disc; the driving blade being mounted to a front end of the spindle closer to the transmission unit to locate outside the housing.

2. The wind power generating device as claimed in claim 1, wherein the rotating unit further includes a secondary driving blade mounted to a rear end of the spindle to locate outside the rear end wall of the housing.

3. The wind power generating device as claimed in claim 1, wherein the housing is provided on the peripheral wall thereof with a plurality of air intakes, and on the rear end wall thereof with a plurality of air outlets.

4. The wind power generating device as claimed in claim 2, wherein the housing is provided on the peripheral wall thereof with a plurality of air intakes, and on the rear end wall thereof with a plurality of air outlets.

5. The wind power generating device as claimed in claim 3, wherein the rotating unit further includes a cooling blade mounted on the spindle to locate inside the housing; the cooling blade being rotated along with the spindle to suck external cold air into the housing via the air intakes; and the cold air being heated in the housing through heat exchange and then discharged by the cooling blade out of the housing via the air outlets.

6. The wind power generating device as claimed in claim 4, wherein the rotating unit further includes a cooling blade mounted on the spindle to locate inside the housing; the cooling blade being rotated along with the spindle to suck external cold air into the housing via the air intakes; and the cold air being heated in the housing through heat exchange and then discharged by the cooling blade out of the housing via the air outlets.

7. The wind power generating device as claimed in claim 5, wherein the transmission unit further includes a support, to which free ends of the shafts forward extended from the winding disc and through the planetary gears are connected.

8. The wind power generating device as claimed in claim 6, wherein the transmission unit further includes a support, to which free ends of the shafts forward extended from the winding disc and through the planetary gears are connected.

* * * * *